(12) United States Patent
Stewart et al.

(10) Patent No.: US 11,001,430 B2
(45) Date of Patent: May 11, 2021

(54) BATTERY PACKAGE

(71) Applicant: DURACELL U.S. OPERATIONS, INC., Wilmington, DE (US)

(72) Inventors: Scott Stewart, Bethel, CT (US); Joseph Cerone, Bethel, CT (US); Bryan Shova, Chicago, IL (US); Kelly Lin, Chicago, IL (US); Jacqueline Denham, Chicago, IL (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 0 days.

(21) Appl. No.: 15/784,018

(22) Filed: Oct. 13, 2017

(65) Prior Publication Data

US 2019/0112115 A1    Apr. 18, 2019

(51) Int. Cl.
*B65D 75/34* (2006.01)
*B65D 75/36* (2006.01)
(Continued)

(52) U.S. Cl.
CPC ............ *B65D 75/367* (2013.01); *B65D 5/38* (2013.01); *B65D 75/326* (2013.01); *B65D 75/327* (2013.01); *B65D 75/525* (2013.01); *B65D 75/563* (2013.01); *B65D 77/0433* (2013.01); *B65D 77/2096* (2013.01); *H01M 50/24* (2021.01); *B65D 83/0088* (2013.01); *B65D 2575/329* (2013.01);
(Continued)

(58) Field of Classification Search
CPC .... B65D 75/367; B65D 75/563; B65D 85/00; B65D 83/04; B65D 77/04; B65D 75/326; B65D 75/327; B65D 75/328; B65D 75/366; B65D 75/368; B65D 75/56; B65D 77/0446; B65D 77/0453; B65D 77/046; B65D 77/0433; B65D 83/0088; B65D 85/20; B65D 2585/88; B65D 2575/3272; B65D 2575/565; B65D 2207/00; H01M 2/1094; H01M 2/105; B23P 17/04
USPC .................. 206/703, 705, 806, 495; 220/495
See application file for complete search history.

(56) References Cited

U.S. PATENT DOCUMENTS 3,303,930 A    2/1967   Hyland
3,394,801 A    7/1968   Hanson
(Continued)

FOREIGN PATENT DOCUMENTS

CH              687196 A5      10/1996
CN           103347790 A       10/2013
(Continued)

OTHER PUBLICATIONS

Ecobliss Launches Easy to Open Blister Pack, downloaded from the Internet at: <http://print-packagingblog.com/ecobliss-launches-easy-to-open-blister-pack/> (posted Sep. 9, 2013).
(Continued)

*Primary Examiner* — Allan D Stevens
(74) *Attorney, Agent, or Firm* — Marshall, Gerstein & Borun LLP

(57) ABSTRACT

A battery package is described herein that advantageously maintains separation between batteries received therein while also providing a resealable opening to sequentially retrieve batteries therefrom. Further, the battery package can include an outer covering.

7 Claims, 10 Drawing Sheets

(51) Int. Cl.
  *B65D 77/04*     (2006.01)
  *B65D 77/20*     (2006.01)
  *B65D 75/32*     (2006.01)
  *B65D 5/38*      (2006.01)
  *B65D 75/52*     (2006.01)
  *H01M 50/24*     (2021.01)
  *B65D 75/56*     (2006.01)
  *B65D 83/00*     (2006.01)

(52) U.S. Cl.
  CPC .............. *B65D 2575/3245* (2013.01); *B65D 2575/3272* (2013.01); *B65D 2575/586* (2013.01); *B65D 2585/88* (2013.01)

(56) References Cited

U.S. PATENT DOCUMENTS

| | | | |
|---|---|---|---|
| 3,635,331 A | | 1/1972 | Zucker |
| 4,632,242 A * | | 12/1986 | Choi ...................... B65D 11/10 |
| | | | 16/429 |
| D302,662 S | | 8/1989 | Calcerano et al. |
| 4,958,731 A | | 9/1990 | Calcerano |
| 5,184,724 A | | 2/1993 | Mayled |
| 5,297,679 A | | 3/1994 | Rondone et al. |
| 5,609,253 A | | 3/1997 | Goade, Sr. |
| D398,844 S | | 9/1998 | Oberloier |
| 5,839,583 A | | 11/1998 | Pope et al. |
| D408,732 S | | 4/1999 | Gaffney et al. |
| 5,896,996 A * | | 4/1999 | Chuang ................... B65D 5/18 |
| | | | 206/318 |
| D427,523 S | | 7/2000 | Calcerano |
| 6,109,439 A | | 8/2000 | Goade, Sr. |
| D432,009 S | | 10/2000 | Pirro et al. |
| D432,411 S | | 10/2000 | Pirro et al. |
| D432,908 S | | 10/2000 | Pirro et al. |
| D433,936 S | | 11/2000 | Pirro et al. |
| 6,155,414 A | | 12/2000 | Vaessen |
| 6,244,444 B1 * | | 6/2001 | Jacobus ............... B65D 25/205 |
| | | | 206/470 |
| D449,779 S | | 10/2001 | Otto |
| 6,308,832 B1 | | 10/2001 | Pirro et al. |
| D450,239 S | | 11/2001 | Otto |
| D451,014 S | | 11/2001 | Otto |
| D451,015 S | | 11/2001 | Otto |
| D451,382 S | | 12/2001 | Adkins |
| D456,249 S | | 4/2002 | Pearson et al. |
| D456,252 S | | 4/2002 | Weil |
| 6,439,390 B1 | | 8/2002 | Kumakura et al. |
| D462,615 S | | 9/2002 | Weil |
| D470,047 S | | 2/2003 | Lee et al. |
| D479,125 S | | 9/2003 | Kumakura et al. |
| D479,126 S | | 9/2003 | Kumakura et al. |
| D480,964 S | | 10/2003 | Lee |
| D499,962 S | | 12/2004 | Lee et al. |
| D506,925 S | | 7/2005 | Plumer |
| 6,918,532 B2 | | 7/2005 | Sierra-Gomez et al. |
| D508,398 S | | 8/2005 | Lee et al. |
| D508,844 S | | 8/2005 | Calcerano |
| D510,261 S | | 10/2005 | Calcerano |
| D520,356 S | | 5/2006 | Kellar et al. |
| D524,654 S | | 7/2006 | Harada et al. |
| D544,788 S | | 6/2007 | Brittain |
| D577,992 S | | 10/2008 | Sutker et al. |
| D581,264 S | | 11/2008 | Mapes, Jr. |
| D584,138 S | | 1/2009 | Lafortezza et al. |
| D593,854 S | | 6/2009 | Casanova et al. |
| 7,571,813 B2 | | 8/2009 | Weisskopf |
| D625,598 S | | 10/2010 | Ruth |
| D631,371 S | | 1/2011 | Borgheim et al. |
| D632,169 S * | | 2/2011 | Ruth ............................. D9/418 |
| 8,006,834 B2 | | 8/2011 | Marcinkowski |
| D646,561 S | | 10/2011 | Pugh |
| D646,567 S | | 10/2011 | Graham et al. |
| 8,066,125 B2 | | 11/2011 | Kang et al. |
| D650,668 S | | 12/2011 | Graham et al. |
| D651,509 S | | 1/2012 | Methe et al. |
| 8,114,451 B2 | | 2/2012 | Sierra-Gomez et al. |
| D662,815 S | | 7/2012 | Methe et al. |
| D678,764 S | | 3/2013 | Powers et al. |
| 8,430,244 B2 | | 4/2013 | Kennedy et al. |
| D689,374 S | | 9/2013 | Logue |
| D691,058 S | | 10/2013 | Akers, Jr. |
| 8,549,460 B2 * | | 10/2013 | Law ...................... H01L 23/481 |
| | | | 257/774 |
| D694,101 S | | 11/2013 | Radomyselski et al. |
| D695,625 S | | 12/2013 | Limback |
| D697,398 S | | 1/2014 | Guevara-Ludt |
| D712,280 S | | 9/2014 | Radomyselski et al. |
| D715,637 S | | 10/2014 | Caminada |
| 8,955,671 B1 * | | 2/2015 | Barnett .................. B65D 25/22 |
| | | | 206/1.5 |
| D723,365 S | | 3/2015 | Mitchell et al. |
| D724,425 S | | 3/2015 | Atkinson |
| D730,169 S | | 5/2015 | Atkinson |
| D731,883 S | | 6/2015 | Davidson et al. |
| 9,060,919 B2 * | | 6/2015 | Babineau .............. A61J 7/0084 |
| D739,227 S | | 9/2015 | Mitchell et al. |
| D739,241 S | | 9/2015 | Markle et al. |
| D742,735 S | | 11/2015 | Fetman |
| D751,387 S | | 3/2016 | Markle et al. |
| D767,985 S | | 10/2016 | Schouten |
| 9,809,368 B2 | | 11/2017 | Huffer |
| D805,890 S | | 12/2017 | Hong |
| D813,028 S | | 3/2018 | Saito et al. |
| 9,950,840 B2 | | 4/2018 | Radomyselski et al. |
| D818,816 S | | 5/2018 | Baker et al. |
| D818,817 S | | 5/2018 | Baker et al. |
| D818,818 S | | 5/2018 | Debnath et al. |
| D819,437 S | | 6/2018 | Baker et al. |
| D820,674 S | | 6/2018 | Yuan |
| D822,479 S | | 7/2018 | Baker et al. |
| D827,423 S | | 9/2018 | DeMaere et al. |
| D827,424 S | | 9/2018 | DeMaere et al. |
| D833,270 S | | 11/2018 | Fath et al. |
| D833,861 S | | 11/2018 | Stadelmaier et al. |
| D844,428 S | | 4/2019 | Stadelmaier et al. |
| D859,141 S | | 9/2019 | Baker et al. |
| D869,268 S | | 12/2019 | Baker et al. |
| 2001/0052478 A1 * | | 12/2001 | Casanova ........... B65D 73/0092 |
| | | | 206/703 |
| 2003/0217949 A1 | | 11/2003 | Schamante |
| 2004/0035746 A1 | | 2/2004 | Lee et al. |
| 2004/0214052 A1 * | | 10/2004 | Rochelo ................ H01M 2/1055 |
| | | | 429/9 |
| 2006/0065570 A1 | | 3/2006 | Martin et al. |
| 2006/0096887 A1 * | | 5/2006 | Morrison .............. B65D 75/366 |
| | | | 206/703 |
| 2006/0207909 A1 | | 9/2006 | Tada et al. |
| 2006/0283748 A1 | | 12/2006 | Daio et al. |
| 2007/0170087 A1 * | | 7/2007 | Narpes, Jr. ............ B65D 75/366 |
| | | | 206/703 |
| 2007/0273330 A1 | | 11/2007 | Beghelli |
| 2009/0057184 A1 | | 3/2009 | Leaman |
| 2009/0321303 A1 * | | 12/2009 | Kang .................... B65D 43/164 |
| | | | 206/703 |
| 2009/0321304 A1 * | | 12/2009 | Watson .................. B65D 75/24 |
| | | | 206/703 |
| 2009/0321305 A1 * | | 12/2009 | Watson ................ B65D 43/164 |
| | | | 206/703 |
| 2011/0147241 A1 * | | 6/2011 | Marcinkowski ..... B65D 75/367 |
| | | | 206/223 |
| 2011/0158564 A1 | | 6/2011 | Krumme |
| 2011/0293998 A1 | | 12/2011 | Sato et al. |
| 2012/0031809 A1 | | 2/2012 | Methe et al. |
| 2012/0037537 A1 * | | 2/2012 | Schein ...................... B25H 3/06 |
| | | | 206/703 |
| 2012/0152786 A1 * | | 6/2012 | Aldridge ............. B65D 83/0463 |
| | | | 206/467 |
| 2012/0160731 A1 * | | 6/2012 | Aldridge ............. B65D 83/0463 |
| | | | 206/534 |
| 2012/0205276 A1 | | 8/2012 | Shackford |
| 2012/0222990 A1 | | 9/2012 | Fujiwara et al. |

(56) References Cited

U.S. PATENT DOCUMENTS

| | | | |
|---|---|---|---|
| 2013/0068653 A1* | 3/2013 | Lipinski | B65D 75/02 206/524.1 |
| 2014/0069991 A1 | 3/2014 | Lipinski | |
| 2014/0209497 A1 | 7/2014 | Jacobus | |
| 2014/0262907 A1 | 9/2014 | Hsieh | |
| 2015/0122692 A1 | 5/2015 | Kavuru | |
| 2015/0291331 A1 | 10/2015 | Bradford | |
| 2016/0137375 A1* | 5/2016 | Huffer | B65D 77/206 206/467 |
| 2016/0198990 A1 | 7/2016 | Betancur et al. | |
| 2016/0318685 A1* | 11/2016 | Droege | B65D 5/0227 |
| 2017/0166379 A1 | 6/2017 | Larsen | |
| 2017/0313467 A1* | 11/2017 | Strekowski | B65D 5/38 |
| 2017/0355504 A1 | 12/2017 | Cardin et al. | |
| 2018/0036645 A1 | 2/2018 | Ghingold et al. | |
| 2019/0044109 A1 | 2/2019 | Sugimoto et al. | |

FOREIGN PATENT DOCUMENTS

| | | |
|---|---|---|
| CN | 203581621 U | 5/2014 |
| EP | 0885151 B1 | 11/1999 |
| EP | 2138419 A1 | 12/2009 |
| JP | 282273 | 6/1968 |
| JP | 2004149139 A | 5/2004 |
| JP | 1531223 S | 8/2015 |
| WO | WO-97/05038 A1 | 2/1997 |
| WO | WO-02/38470 A1 | 5/2002 |
| WO | WO-2017/145796 A1 | 8/2017 |

OTHER PUBLICATIONS

U.S. Appl. No. 15/214,897, Reclosable Battery Package, filed Jul. 20, 2016.
U.S. Appl. No. 29/582,649, Packaging for Batteries, filed Oct. 28, 2016.
U.S. Appl. No. 29/582,662, Packaging for Batteries, filed Oct. 28, 2016.
U.S. Appl. No. 29/582,673, Packaging for Batteries, filed Oct. 28, 2016.
U.S. Appl. No. 29/582,680, Packaging for Batteries, filed Oct. 28, 2016.
U.S. Appl. No. 29/622,156, Battery Packaging, filed Oct. 13, 2017.
U.S. Appl. No. 29/622,157, Battery Packaging, filed Oct. 13, 2017.
International Application No. PCT/US2019/066132, International Search Report and Written Opinion, dated Apr. 3, 2020.
International Application No. PCT/US2018/055864, International Search Report and Written Opinion, dated Jan. 4, 2019.

* cited by examiner

BATTERY PACKAGE

FIELD OF THE DISCLOSURE

The present disclosure generally relates to packages and, more particularly, to packages for batteries.

BACKGROUND

Batteries may start conducting electricity if they come into contact with metal or if the positive terminals of one battery contacts the negative terminal of another battery. As a result, batteries that come into contact with metal or batteries with positive terminals that come into contact with negative terminals will drain quickly and can create heat. Accordingly, proper storage should minimize the occurrence of such events.

SUMMARY

A battery package is described herein that includes a tray having a recessed portion and a perimeter flange extending outwardly from edges of the recessed portion about a perimeter of the recessed portion. The recessed portion includes curved surface portions where each curved surface portion is configured to receive a cylindrical battery therein. The battery package further includes a cover disposed over the recessed portion and at least a portion of the perimeter flange and a resealable adhesive disposed between the tray and cover. Further, the battery package includes a sleeve having panel portions that form a tubular configuration with an open top and an open bottom. The panel portions are configured to extend around the cover and tray.

In embodiments, the tray can include a tab extending from an edge of the flange thereof that projects through the open top of the sleeve. In embodiments, the sleeve can include a flap adjacent to the open top thereof, where the flap has an opening extending therethrough and is configured to project over the open top of the sleeve to receive the tab through the opening thereof to thereby align the tray with the sleeve.

In some embodiments, the tray can include a stand portion that projects rearwardly such that the tray is configured to stand upright resting at least partially on the stand portion thereof. In embodiments, the sleeve can include a rear panel that abuts the stand portion when the tray is inserted into the sleeve.

In another form, a battery package is described herein that includes a base having a back wall, a sidewall extending from edges of the back wall, and a perimeter flange extending outwardly from edges of the sidewall. The battery package further includes a tray with a recessed portion that is configured to nest within the base. The recessed portion includes curved surface portions where each curved surface portion is configured to receive a cylindrical battery therein. The battery package also includes a cover disposed over the recessed portion of the tray and at least a portion of the perimeter flange of the base and a resealable adhesive disposed between the base and the cover, as well as a sleeve that has panel portions forming a tubular configuration with an open top and an open bottom. The panel portions are configured to extend around the cover and base.

In embodiments, the tray can include a tab extending from an edge of the recessed portion thereof that projects between the cover and the base and through the open top of the sleeve. In embodiments, the sleeve can include a flap adjacent to the open top thereof that has an opening extending therethrough and is configured to project over the open top of the sleeve to receive the tab through the opening to thereby align the tray, base, and cover with the sleeve. In embodiments, the sidewall of the base can include an opening extending therethrough where the opening is configured to receive the tab therethrough.

In some embodiments, the base can include a rearwardly projecting lower portion such that the base is configured to stand upright resting at least partially on the stand portion thereof. In embodiments, the sleeve can include a rear panel that is adapted to abut the rearwardly projecting lower portion when the base is inserted into the sleeve.

BRIEF DESCRIPTION OF THE DRAWINGS

The above needs are at least partially met through provision of the battery package described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful in a commercially feasible embodiment may not be depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

A battery package is described herein that advantageously maintains separation between batteries received therein while also providing a resealable opening to sequentially retrieve batteries therefrom. Further, the battery package can include an outer covering or sleeve to hold the various individual components together during storage.

Figure 7:
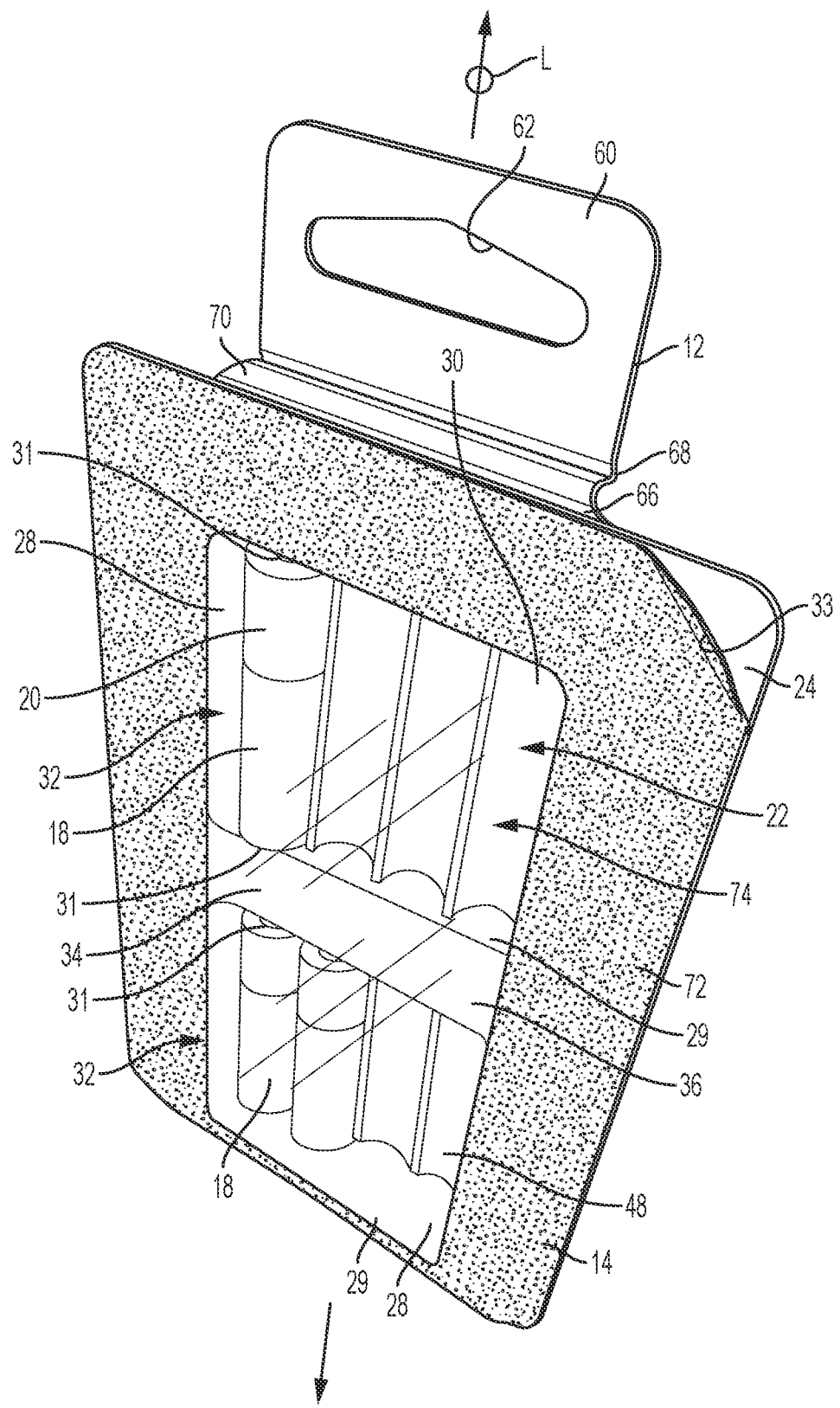
FIG. 7 is a perspective view of the tray and cover of the battery package of FIG. 1 in accordance with various embodiments of the present disclosure.
Figure 8:
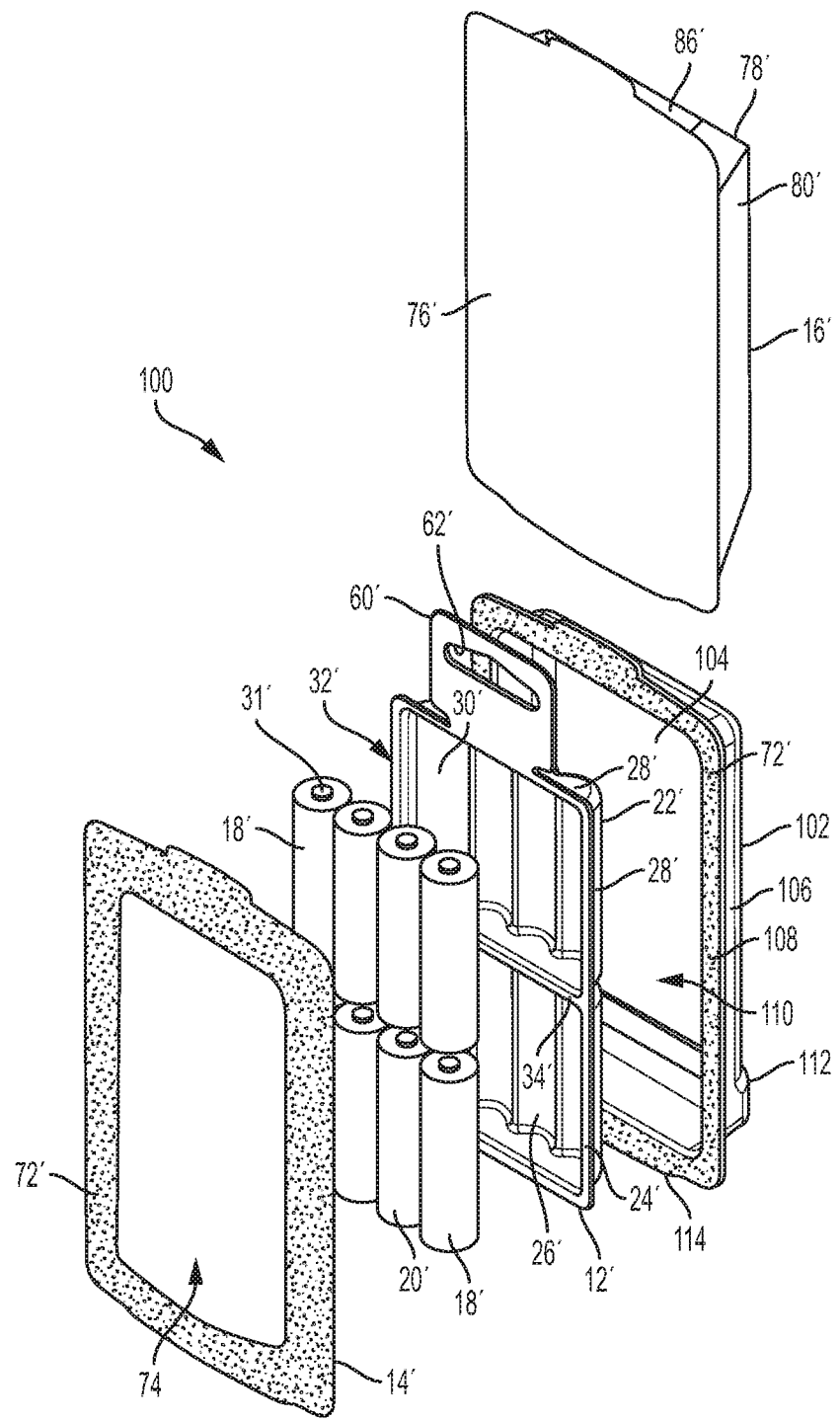
FIG. 8 is an exploded perspective view for a second embodiment of a battery package in accordance with various embodiments of the present disclosure.
Figure 9:
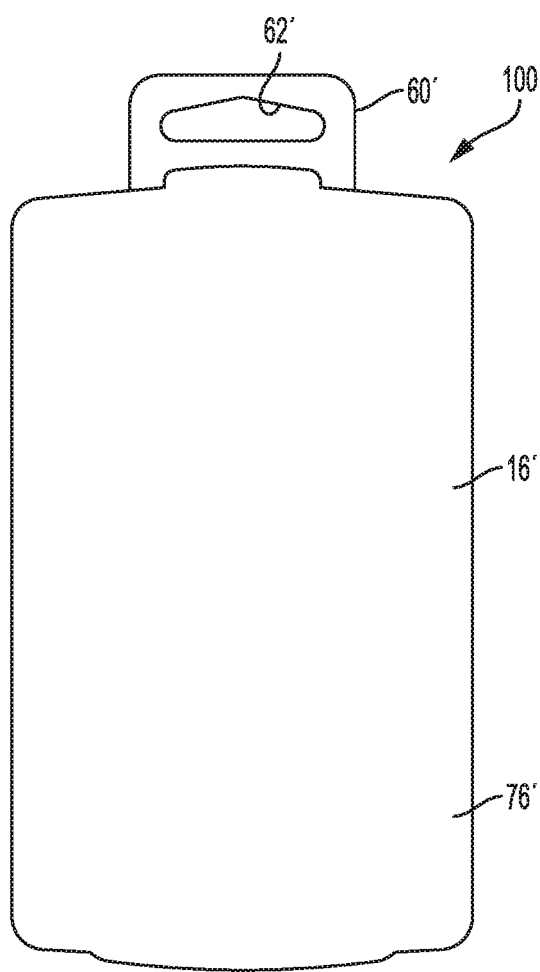
FIG. 9 is a front elevation view of the battery package of FIG. 8 in accordance with various embodiments of the present disclosure.
Figure 10:
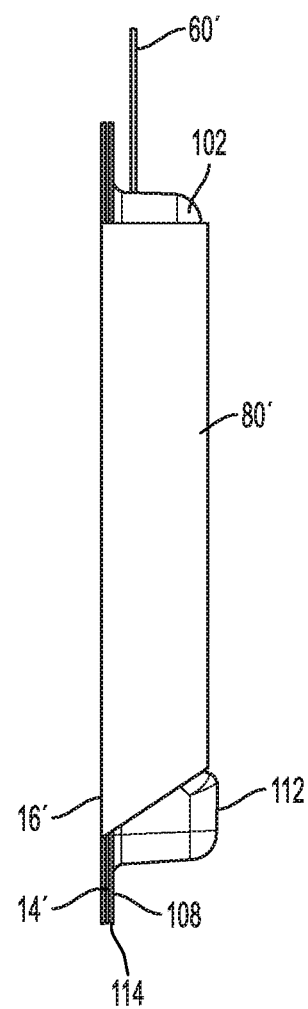
FIG. 10 is a side elevation view of an example battery package in accordance with various embodiments of the present disclosure.
Figure 11:
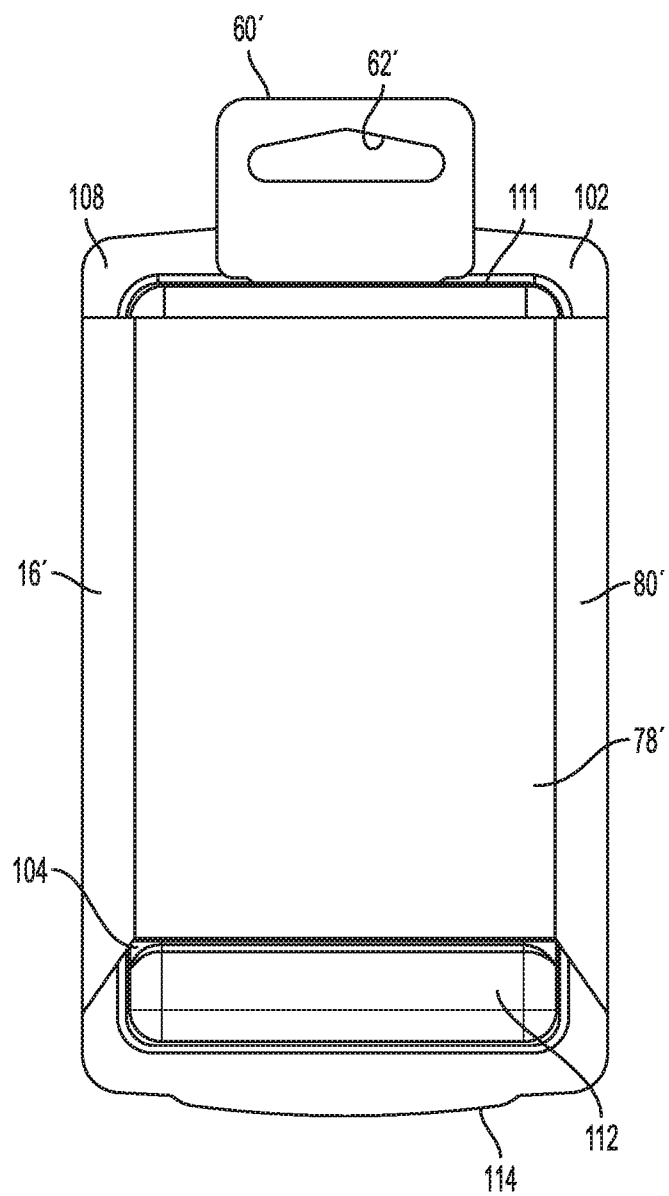
FIG. 11. is a rear elevation view of the battery package of FIG. 10 in accordance with various embodiments of the present disclosure.

An exemplary battery package 10 of a first form is shown in FIGS. 1-7. The battery package 10 includes a tray 12, a cover 14, and a sleeve 16 that extend generally along a longitudinal axis L. As shown in FIG. 7, the tray 12 is configured to receive batteries 18 having a cylindrical sidewall 20 therein, while the cover 14 is configured to adhere to the tray 12 to secure the batteries 18 therebetween. In a closed configuration, i.e., when the tray 12 is contained within the sleeve 16, the sleeve 16 extends around the tray 12 and cover 14.

Details of the tray 12 are shown in FIG. 7. The tray 12 includes a recessed central portion 22 and a perimeter flange 24 extending outwardly from the recessed central portion 22. The recessed central portion 22 has a back wall 26 and a sidewall 28 that extends between the back wall 26 and the perimeter flange 24. The recessed central portion 22 is configured to receive the batteries 18 therein and, preferably, is sized so that the batteries 18 are fully received therein such that the batteries 18 do not break a plane of the perimeter flange 24.

The back wall 26 includes a plurality of bays 30, each having a surface with a curved, partially cylindrical configuration, each bay 30 extending in a parallel direction along a longitudinal axis L of the package 10. Preferably, the cylindrical configuration of the bays 30 is sized to be complementary to the cylindrical sidewall 20 of the batteries 18 so that when the batteries 18 are received therein, the bays 30 restrict lateral movement thereof. Additionally, a length of the bays 30 between end walls 29 thereof can be sized to be slightly larger, e.g., about 1-5 mm larger than a length of the batteries 18 intended to be received therein. So configured, the bays 30 and the dimensions of the recessed central portion 22 cooperate to restrict movement of the batteries 18. Further, restricting movement of the batteries 18 also advantageously aids in preventing terminals 31 of the batteries 18 from contacting one another when contained within the package 10.

The tray 12 can advantageously be configured to store any desired number of batteries 18 therein. For example, although the illustrated tray 12 includes a row 32 of four bays 30, any desired number of bays 30 can be provided in a row 32. Additionally, as shown in FIG. 7, the tray 12 can include multiple recessed portions 22. The multiple recessed portions 22 can be provided in a stacked configuration with a divider 34 extending therebetween and providing the end walls 29 for the bays 30 on both sides thereof. In one approach, the divider 34 includes a forwardly facing wall 36 extending between the end walls 29. The forwardly facing wall 36 is disposed above a bottom surface of the bays 30 and the end walls 29 can prevent contact between the negative terminal of a battery 18 in a recessed portion 22 and the positive terminal of a different battery 18 in a second recessed portion 22. In the illustrated form, the forwardly facing wall 36 is recessed with respect to the flange 24. Alternatively, the forwardly facing wall 36 can be co-planar with the flange 24.

Figure 4:
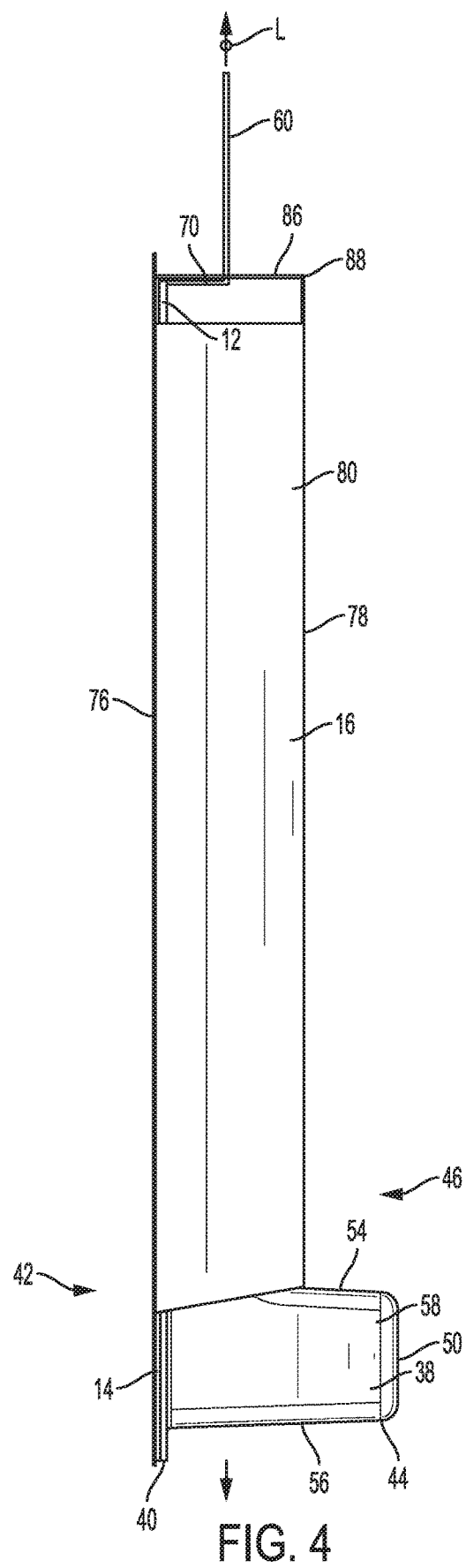
FIG. 4 is a side elevation view of the battery package of FIG. 1 in accordance with various embodiments of the present disclosure.
Figure 5:
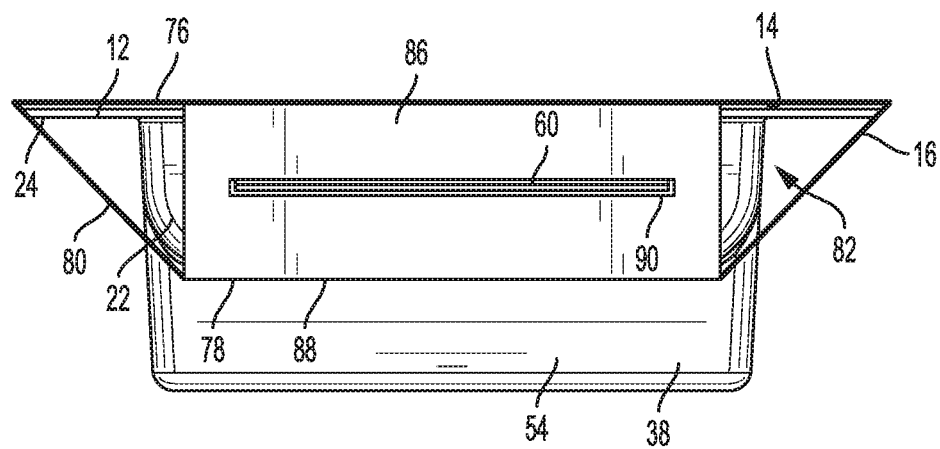
FIG. 5 is a top plan view of the battery package of FIG. 1 in accordance with various embodiments of the present disclosure.
Figure 6:
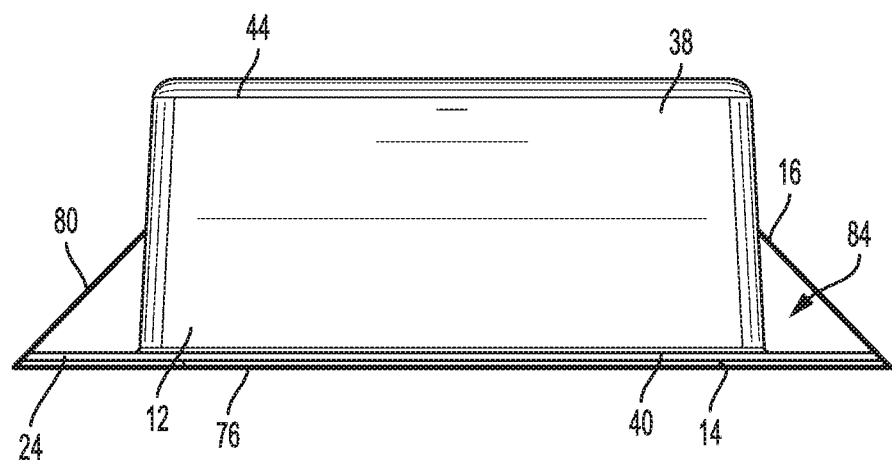
FIG. 6 is a bottom plan view of the battery package of FIG. 1 in accordance with various embodiments of the present disclosure.

As shown in FIG. 4, the tray 12 can further include a rearwardly projecting stand portion 38. So configured, the tray 12 can stand in an upright position resting on a bottom edge 40 of the flange 24 along a front 42 thereof and on a bottom edge or surface 44 of the stand portion 38 on a rear 46 thereof. If desired, the flange 24 and stand portion 38 can be sized so that the tray 12 rests at a slightly angled orientation with respect to vertical. For example, the tray 12 can be angled between about 5 degrees and about 30 degrees with respect to vertical, more specifically between about 10 degrees and about 20 degrees, and more specifically between about 10 degrees and about 15 degrees.

In the illustrated form, the stand portion 38 has a generally parallelepiped shape that extends rearwardly from a lower portion 48 of the back wall 26 corresponding to the bottom row 32 of bays 30. With this shape, the stand portion 38 includes a rear wall 50 that is suitable for placement of alphanumeric material (e.g., branding or other identification of the batteries 18), a top wall 54, a bottom wall 56, and side walls 58 extending therebetween. The alphanumeric material can formed in the tray 12 as shown, embossed, printed, adhered thereto using a label, as so forth.

In alternative forms (not shown), the stand portion 38 can be provided by one or more rearwardly extending walls projecting from the back wall 26, the corner between the back wall 26 and sidewall 28, or the bottom edge 40 of the flange 24. The rearwardly extending wall can have any desired configuration, such as generally perpendicular with respect to the longitudinal axis L, at an angle thereto, a plurality of generally vertical walls, and so forth.

The tray 12 can also include a tab 60 having a hanging feature 62, such as a hang hole, projecting therefrom. In the illustrated embodiment the tab 60 is projecting from a top edge 64 of the perimeter flange 24. As shown, while projecting from the perimeter flange 24, the tab 60 is folded towards the back wall 26 to project above an intermediate depth of the tray 12. More specifically, the tab 60 includes a first fold 66 substantially perpendicular to a longitudinal axis L, the first fold 66 extending from the top edge 64 of the flange 24 and a second fold 68 substantially perpendicular to the first fold 66, the second fold 68 being spaced from the first fold 66 by a rearwardly extending wall portion 70, and extending from an edge of the rearwardly extending wall portion 70 opposite from the first fold 66. With this configuration, the tab 60 projects upwardly, generally along the longitudinal axis L when the tray 12 is contained within the sleeve 16. In the illustrated form, the wall portion 70 is sized to be less than a depth of the recessed central portion 22 of the tray 12 and, more specifically, about half the depth of the recessed central portion 22. The hanging feature 62 can take any suitable shape and/or configuration as is commonly understood.

The tray 12 can be made using any suitable method, such as in a mold using pressed paper pulp, injection molding, blow molding, and so forth. Any suitable paperboard or plastic material may be used to make the tray, for example, nylon, polypropylene, polyethylene, polycarbonate, acrylic, polycarbonate, polyvinyl chloride, and polyethylene terephthalate may be used.

As shown in FIG. 7, the cover 14 has a planar configuration with a footprint generally corresponding to the tray 12 and, more particularly, the flange 24 thereof. In the illustrated form, the cover 14 is a flexible film material. Moreover, the cover 14 can be transparent or translucent so that a user can see the batteries 18 remaining within the tray 12. Of course, the cover 14 can alternatively be a flexible, rigid, or semi-rigid, as desired. Generally, the cover 14 is manufactured by blown film extrusion, cast film extrusion, or the like. The cover 14 may comprise any suitable paperboard or plastic material, for example, nylon, cellophane, polypropylene, polyethylene, polycarbonate, acrylic, polycarbonate, polyvinvyl chloride, and polyethylene terephthalate may be used. Further, if desired, such as for trays 12 having multiple recessed portions 22, the cover 14 can be divided into multiple, separate portions. For example, each cover 14 can cover one of the recessed portions 22 and adhere to the portion of the flange 24 extending therearound. Additionally, if the divider wall 36 is co-planar with or slightly offset from the flange 24, the cover 14 or covers 14 could additionally adhere to a portion of the divider wall 36 and be perforable such that it can be easily removed once the batteries 18 contained in the row 32 are removed/used.

As discussed above, the tray 12 and cover 14 are adhesively connected together. In a preferred approach, the tray 12 and cover 14 are coupled together using a resealable adhesive 72 as shown in FIG. 7. For example, the resealable adhesive 72 can be a pressure sensitive adhesive. As such, when a user peels back the cover 14 to remove one or more batteries 18, the user can reseal the cover 14 onto the tray 12 to thereby secure the remaining batteries 18 therein. Moreover, with packages 10 having multiple rows 32 of bays 30, a user need only peel back the cover 14 to expose a desired portion of the tray 12. If desired, a tab 33 of the cover 14 being adhesive-free can be provided so that the user can easily grip the cover 14 for opening. The tab 33 can be in the corner as shown, along a side, or combinations thereof.

By a first approach, the resealable adhesive 72 can be disposed on the perimeter flange 24 of the tray 12. So configured, the cover 14 can be aligned with the flange 24 and applied thereto. With a pressure sensitive adhesive, the cover 14 can be adhered to the flange 24 using pressure.

By a second approach, the resealable adhesive 72 can be disposed on the cover 14 at least in areas corresponding to and capable of contacting the perimeter flange 24 of the tray 12. The resealable adhesive 72 of this form can include a void 74 spaced inwardly from the perimeter of the cover 14 and configured to align with the recessed portion(s) 22 when the cover 14 is adhered to the tray 12. As such, the cover 14 does not adhere to the batteries 18 within the tray 12. The void 74 can be an area without adhesive disposed thereon or can be an area with a deadening material disposed on the adhesive 72 such that the adhesive is rendered inactive.

An example sleeve 16 is shown in FIGS. 1-7. The sleeve 16 includes a front panel 76, a rear panel 78, and side panels 80 extending between the front and rear panels 76, 78. So configured, the sleeve 16 has a tubular configuration with an open top 82 and an open bottom 84. The sleeve 16 is configured to slide over the tray 12 and cover 14 when they are adhered together.

In the illustrated form, a cross-section of the sleeve 16 has a generally trapezoidal configuration where the front panel 76 has a perimeter corresponding to the perimeter flange 24 of the tray 12 and the cover 14, the rear panel 78 has a width corresponding to a width of the recessed portion 22, and the side panels 80 extend therebetween. The rear panel 78 can have a length that is adapted to abut the stand portion 38 when the tray 12 and cover 14 is fully received within the sleeve 16. As such, the rear panel 78 of this form has a smaller length than the front panel 76. Optionally, the side panels 80 can have a length corresponding to the rear panel 78 as shown or the front panel 76. The sleeve 16 can be made from any suitable material, such as paperboard or cardboard. The sleeve 16 can be cut from a sheet of material and folded as shown in the figures to form the panel portions thereof. In order to hold the tubular form of the sleeve, the sleeve can include overlapping portions, such as along one of the side panels 80 thereof, so that the overlapping portions can be adhered or otherwise secured together. Alternatively, any suitable plastic material, for example, nylon, polypropylene, polyethylene, polycarbonate, acrylic, polycarbonate, polyvinvyl chloride, and polyethylene terephthalate may be used.

Figure 1:
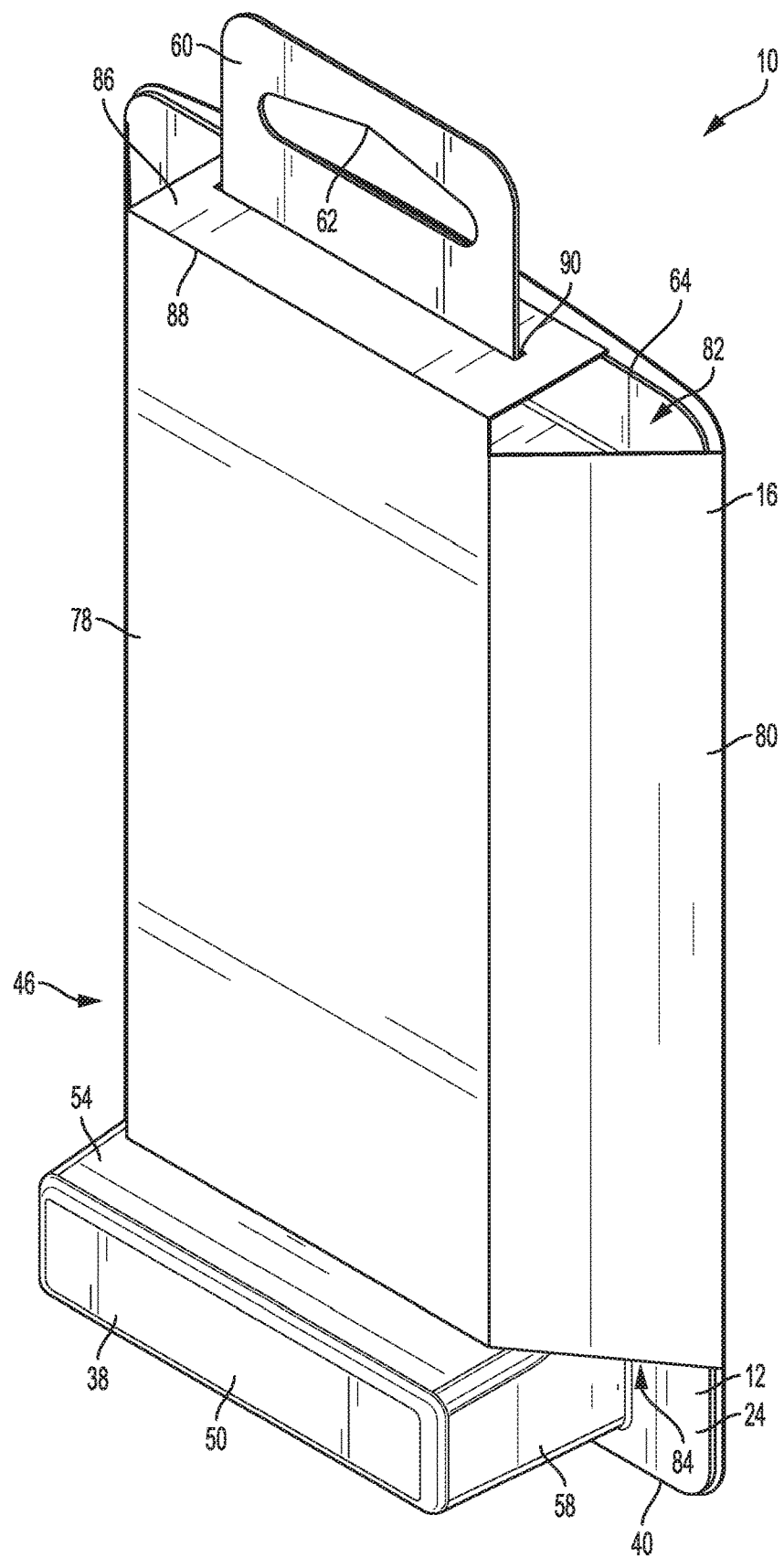
FIG. 1 is a rear perspective view of a battery package in accordance with various embodiments of the present disclosure.
Figure 2:
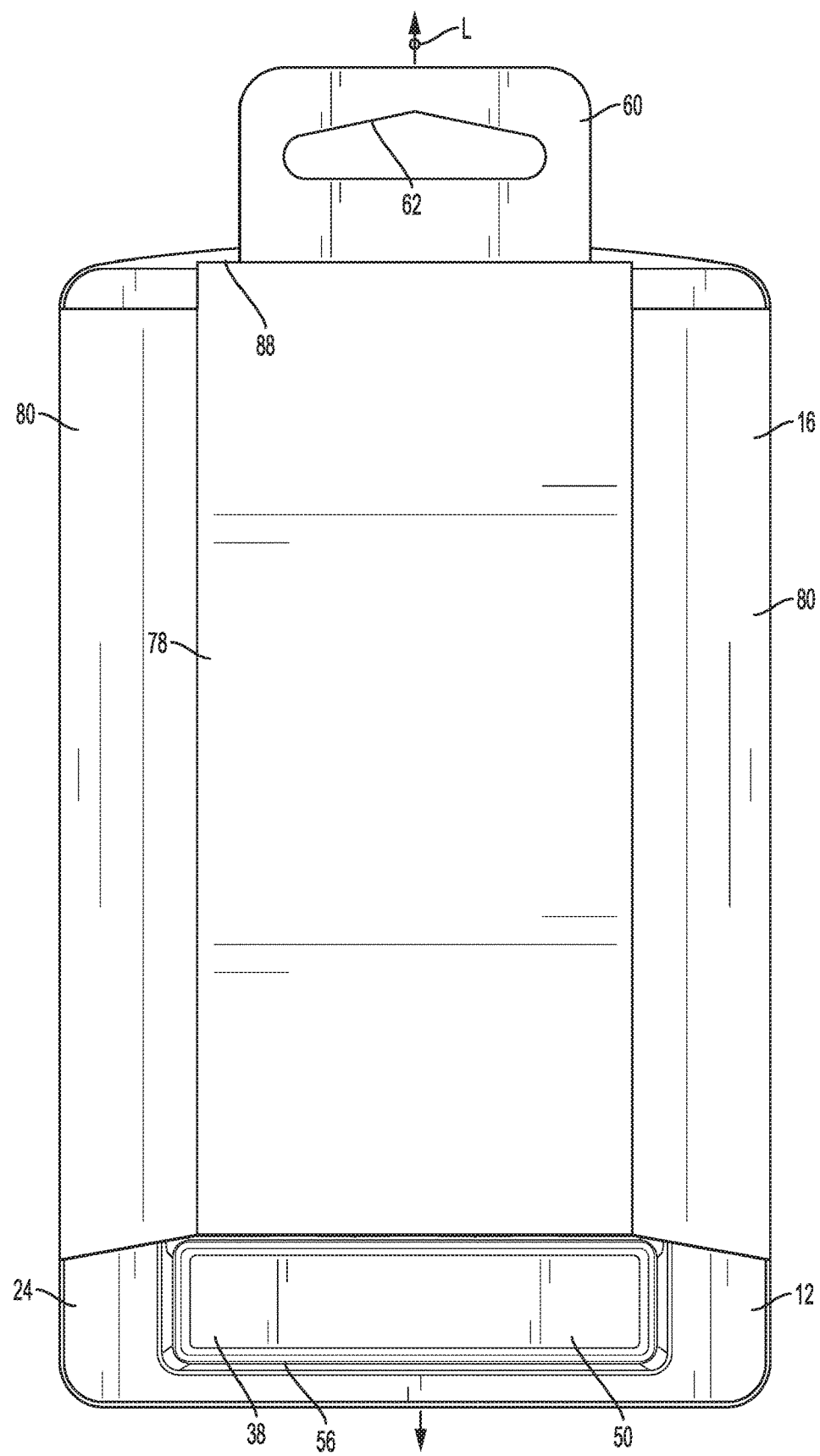
FIG. 2 is a rear elevation view of the battery package of FIG. 1 in accordance with various embodiments of the present disclosure.
Figure 3:
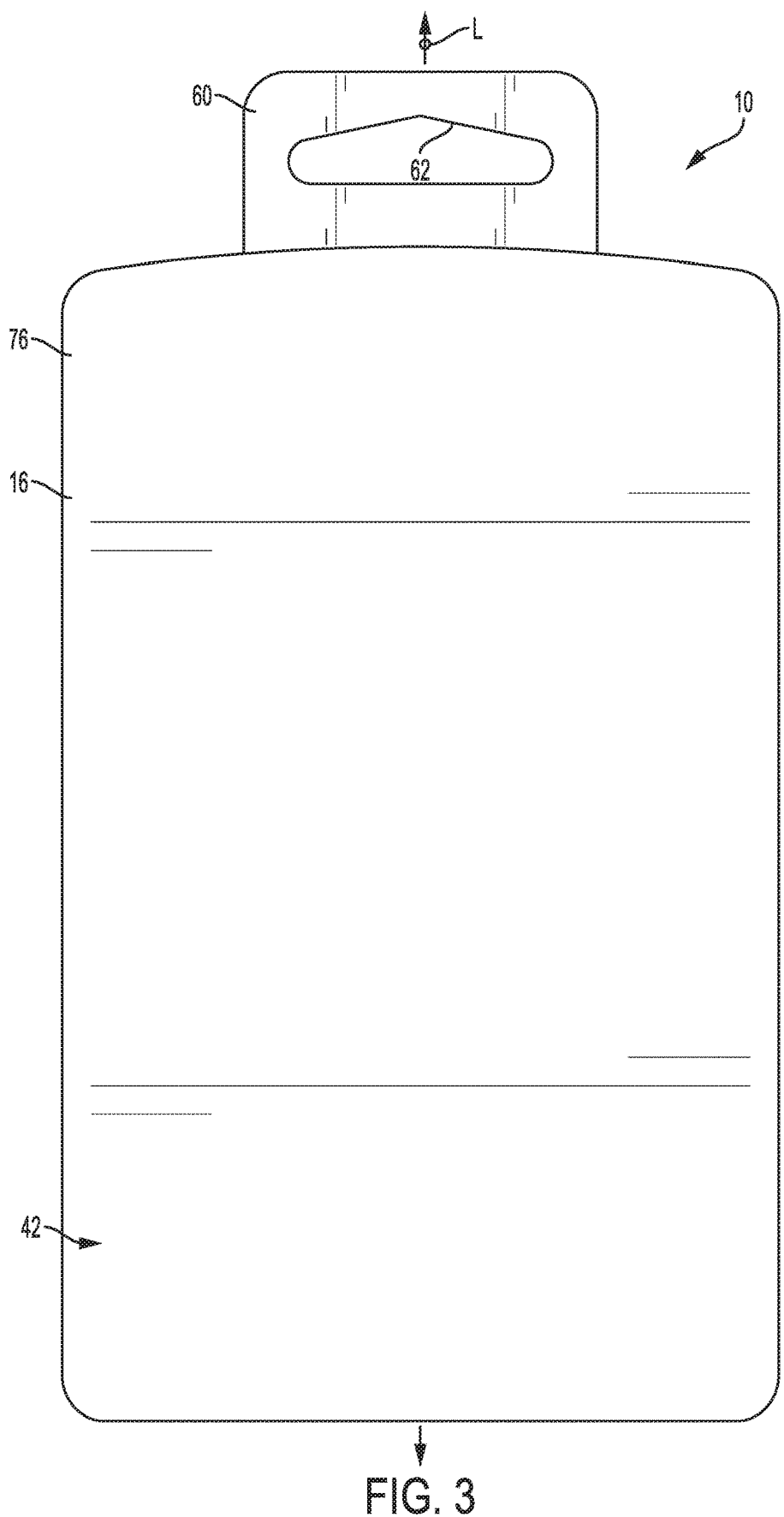
FIG. 3 is a front elevation view of the battery package of FIG. 1 in accordance with various embodiments of the present disclosure.

As shown in FIG. 1, the sleeve 16 can further include a flap 86 that extends from a top edge 88 of the rear panel 78. The flap 86 is configured to fold over the open top 82 of the sleeve 16 and be secured to an interior surface of the front panel 76 by any suitable mechanism, such as an adhesive, a mechanical interaction between a tab and an aperture on the flap and a top edge of the front panel 76 and so forth. The flap 86 optionally further includes an elongate slot opening 90 extending therethrough. The opening 90 is configured to be disposed in an intermediate position between the front and rear panels 76, 78 when the flap 86 is folded over. As such, when the tray 12 is slid into the sleeve 16, the tab 60 thereof extends through the opening 90 and the wall portion 70 thereof abuts the flap 86. This configuration effectively aligns the tray 12 with the cover 14 adhered thereto within the sleeve 16. Moreover, when the tray 12 is hung on a product display using the hanging feature 62 of the tab 60, the sleeve 16 is prevented from being removed. If desired, the connection between the flap 86 and the rear panel 78 can be a line of weakness, such as a perforation, score line, or the like, so that a user can easily remove the flap 86 after purchase. Similarly, a line of weakness may be included between the tab 60 and the tray 12.

An alternative form for a battery package 100 is shown in FIGS. 8-11. The package 100 of this form includes many similarities to the package 10 described above and as such only the differences will be discussed herein.

The package 100 of this form includes the tray 12', cover 14', and sleeve 16' and further includes a base 102. The base 102 includes a rear wall 104, a sidewall 106, and a perimeter flange 108 extending outwardly from a perimeter of the sidewall 106 opposite the rear wall 104. The base 102 defines an interior 110 configured to receive the tray 12' therein. As shown, the package 100 includes batteries 18' having a cylindrical sidewall 20' and terminals 31' and the tray 12' includes a back wall 26' including a plurality of bays 30' provided in a row 32' and a hanging feature 62', and the sleeve 16' includes a front or cover panel 76', a rear or back panel 78', and side or sidewall panels 80' extending between the front and rear panels 76', 78'.

As shown, the tray 12' nests within the base 102 and is captured between the base 102 and the cover 14'. The resealable adhesive 72' can be disposed between the cover 14' and the perimeter flange 108 of the base 102. Alternatively, the cover 14' can be adhered to the flange 24' of the tray 12'. As with the above form, the adhesive 72' can be disposed on the cover 14' with the corresponding void 74 or, alternatively, can be disposed on the base perimeter flange 108 and/or the tray flange 24'.

In another aspect, the tab 60' of the tray 12' can project upwardly without the folds of the above form. As such, in a first form, when the tray 12' is nested within the base 102, the tab 60' projects in front of the flange 108 of the base 102 and can be at least partially captured between the flange 108 and the cover 14' when the cover 14' is adhered to the base 102. If desired, the sleeve 16' can optionally include a similarly configured flap 86' to align the base 102, tray 12', and cover 14' within the sleeve 16'. In a second form, as with the base 102 shown in FIG. 11, the sidewall 106 can include an elongate opening 111 in a top portion thereof configured to receive the tab 60' therethrough when the tray 12' is nested within the base 102.

Moreover, due to the nested configuration of the tray 12', the base 102 can include a rearwardly projecting portion 112 abutting the rear panel 78' of the sleeve 16'. Although the rearwardly projecting portion 112 may not be configured to provide a standing feature for the package 100, the portion 112 can have dimensions or configurations similar to the above-described stand portion 38 so that the package 100 can similarly stand in an upright orientation resting on the rearwardly projecting portion 112 and a front edge 114 of the flange 108.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claim is:

1. A battery package comprising:
   a base having a back wall, a sidewall extending from edges of the back wall, and a perimeter flange extending laterally outwardly from edges of the sidewall distal to the back wall, the perimeter flange extending laterally away from the back wall to extend around a perimeter of the sidewall;
   a slot opening defined by and extending through the sidewall of the base;
   a tray including a recessed portion and a tab having a completely planar configuration and extending from an edge of the recessed portion and having a hanging feature, the tray configured to nest within the base with the tab extending through the slot opening defined by the sidewall of the base;
   curved surface portions disposed in the recessed portion, each curved surface portion configured to receive a cylindrical battery therein;
   a cover disposed over the recessed portion of the tray and at least a portion of the perimeter flange of the base;
   a resealable adhesive disposed between and in direct contact with an upper surface of perimeter flange of the base and the cover; and
   a sleeve having panel portions extending between a top and a bottom thereof along a longitudinal axis, the sleeve configured to slide over the tray and cover along the longitudinal axis, such that the panel portions extend around the cover and tray when the tray is inserted into the sleeve, wherein the sleeve includes a flap, the flap extending laterally relative to the longitudinal axis at least partially between at least a plurality of the panel portions to at least partially form the top of the sleeve to enclose the tray within the sleeve.

2. The battery package of claim 1, wherein the resealable adhesive is disposed on an interior surface of the cover.

3. The battery package of claim 2, wherein the resealable adhesive includes a void aligned with the recessed portion of the tray, such that when the cover is adhered to the base, the cover does not adhere to cylindrical batteries received within the tray.

4. The battery package of claim 1, wherein the base includes a rearwardly projecting lower portion; and the sleeve includes a rear panel adapted to abut the rearwardly projecting lower portion when the base is inserted into the sleeve.

5. The battery package of claim 1, wherein the tray includes two adjacent recessed portions, each recessed portion containing a plurality of curved surface portions, and the tray includes a divider extending between the adjacent recessed portions.

6. The battery package of claim 1, wherein the panel portions of the sleeve include a cover panel having a perimeter shape corresponding to a perimeter shape of the cover and the flange of the base, a back panel having a width smaller than a width of the cover panel, and sidewall panels extending between the cover and back panels.

7. The battery package of claim 1, wherein the cover is a flexible film material.

\* \* \* \* \*